US012790259B2

(12) United States Patent
Brandt-Slowik et al.

(10) Patent No.: US 12,790,259 B2
(45) Date of Patent: Nov. 10, 2026

(54) GLASS PANE WITH LOW OPTICAL DEFECTS AND PROCESS FOR PRODUCTION AND USE THEREOF

(71) Applicant: SCHOTT Technical Glass Solutions GmbH, Jena (DE)

(72) Inventors: Juliane Brandt-Slowik, Jena (DE); Thomas Schmiady, Jena (DE); Stefan Eberl, Jena (DE); Andreas Sprenger, Rothenstein (DE); Armin Vogl, Jena (DE); Michael Meister, Saulheim (DE); Tommy Schröder, Jena (DE); Michael Reinl, Mertendorf (DE)

(73) Assignee: SCHOTT TECHNICAL GLASS SOLUTIONS GMBH, Jena (DE)

( * ) Notice: Subject to any disclaimer, the term of this patent is extended or adjusted under 35 U.S.C. 154(b) by 511 days.

(21) Appl. No.: 18/481,899

(22) Filed: Oct. 5, 2023

(65) Prior Publication Data

US 2024/0158284 A1 May 16, 2024

(30) Foreign Application Priority Data

Sep. 28, 2022 (DE) ..................... 10 2022 125 049.0
Nov. 10, 2022 (DE) ..................... 10 2022 129 719.5

(51) Int. Cl.
*C03C 3/091* (2006.01)
*C03B 18/04* (2006.01)

(52) U.S. Cl.
CPC .............. *C03C 3/091* (2013.01); *C03B 18/04* (2013.01); *C03C 2203/10* (2013.01)

(58) Field of Classification Search
None
See application file for complete search history.

(56) References Cited

U.S. PATENT DOCUMENTS 5,948,133 A 9/1999 Iga
2019/0308394 A1 10/2019 Alkemper
(Continued)

FOREIGN PATENT DOCUMENTS

DE 102007025687 1/2009
DE 102013203624 9/2014
(Continued)

OTHER PUBLICATIONS

English translation of DIN 52305, "Determining the optical distortion and refractive power of safety glazing material for road vehicles", Jun. 1995.
(Continued)

*Primary Examiner* — David Sample
(74) *Attorney, Agent, or Firm* — Ruggiero McAllister & McMahon LLC

(57) ABSTRACT

A glass pane, especially to a glass pane obtained by singularization from a preferably floated glass strip formed by hot forming, is provided. The glass pane is a borosilicate glass with a top side, a bottom side, and a thickness the top and bottom surfaces of at least 1.75 mm and at most 7 mm. The glass pane has a magnitude of the sum total of refractions from the top side and the bottom side within a square area Mb of 500 mm by 500 mm for light incident perpendicularly on the glass pane for a 99.9% quantile of 0 mdpt to less than 1.7 mdpt in at least one direction parallel to the surface of the glass pane.

15 Claims, 10 Drawing Sheets
(2 of 10 Drawing Sheet(s) Filed in Color)

(56) References Cited

U.S. PATENT DOCUMENTS

| | | | |
|---|---|---|---|
| 2020/0354253 | A1 | 11/2020 | Seuthe |
| 2021/0154980 | A1 | 5/2021 | Mottsmith |

FOREIGN PATENT DOCUMENTS

| | | | | | |
|---|---|---|---|---|---|
| DE | 102020104973 | | | 9/2020 | |
| GB | 1338161 | A | * | 11/1973 | ................ B60J 1/02 |
| JP | H0753223 | | | 2/1995 | |
| JP | 2009107913 | | | 5/2009 | |
| WO | 2009054411 | | | 4/2009 | |
| WO | 2018114956 | | | 6/2018 | |
| WO | 2019076492 | | | 4/2019 | |

OTHER PUBLICATIONS

DIN EN 572-2, "Glass in building—Basic soda lime silicate glass products—Part 2: Float glass", Nov. 2012.

* cited by examiner

GLASS PANE WITH LOW OPTICAL DEFECTS AND PROCESS FOR PRODUCTION AND USE THEREOF

CROSS REFERENCE TO RELATED APPLICATIONS

This application claims benefit under 35 USC § 119 of German application DE 10 2022 125 049.0 filed Sep. 28, 2022 and German application DE 10 2022 129 719.5 filed Nov. 10, 2022, the entire contents of both of which are incorporated herein by reference.

BACKGROUND

1. Field of the Invention

The present application relates to a glass pane, preferably to a glass pane having low optical defects, especially low near-surface refractions, to a process for production thereof and to the use thereof.

2. Description of Related Art

Glass panes can be used in a variety of applications, for example in vehicle glazing, in architectural applications or as covers for electronic devices (called display panes).

For example, German patent application DE 10 2007 025 687 B3 describes the use of a glass pane of borosilicate glass in a flat glass display device, and a flat glass display device equipped therewith.

International patent application WO 2018/114956 A1 describes a thin glass substrate and a method and apparatus for production thereof. In the process for producing the thin glass substrate, the viscosity of the glass is controlled. International patent application WO 2019/076492 A1 also describes a thin glass substrate, especially a thin borosilicate glass substrate, and a method and an apparatus for production thereof, where the viscosity of the glass is controlled here too in the production process. Both applications disclose methods of reducing elongated drawing streaks that arise in drawing direction in the hot forming operation, and report measurements transverse to this drawing direction.

Finally, German published specification DE 10 2020 104 973 A1 describes a glass substrate for vehicle glazing, especially for the windshield of a vehicle. For this purpose, the speed of ageing of the glass is controlled.

However, prior art glass panes still have quite marked, especially lenticular, optical defects that may be caused, for example, by near-surface refractions that occur in drawing direction and have not been covered to date by the prior art. However, this can be unfavourable specifically for the use of such panes in display devices.

There is therefore a need for methods of producing glass panes by which optical defects, for example near-surface refractions, can still be reduced, and for glass panes having preferably low optical defects, especially low near-surface refractions that arise in drawing direction. Drawing direction here is understood to mean that direction in which the glass to be hot formed is stretched to the greatest degree when being hot formed.

SUMMARY

One object of the invention is that of providing a glass pane that at least partly reduces the above-described disadvantages of the prior art. A further aspect is that of providing a method of producing such glass panes, and the use of these glass panes.

In a glass pane, especially as considered in the context of the present disclosure, and hence in a glass pane obtained by a hot forming method and having essentially parallel main surfaces, a deflection of the beam path of light incident thereon can arise, which alters the direction of propagation for at least a portion of that light. This deflection can arise as a result of variances in the surface of the glass pane from an ideally planar surface, the result of which is then not, as in the ideal case, merely a solely parallel displacement of the beam path of that light perpendicular to its direction of propagation, for example in the case of inclined passage of the light through the glass pane relative to the glass pane; instead, various types of deflection of the beam path can occur.

If the glass pane has elevations that extend spatially in at least one direction, this can give rise to lenticular refractions which, when viewed through the glass pane, can alter, especially distort, the view of articles behind the glass pane. These image-altering perturbations of the beam path are also referred to as optical defects in the present context and may be regarded as refractions of the surface of the glass pane. Such distortions may be particularly disruptive, for example, in the viewing of a display device that uses a glass pane, for example, as cover pane.

One aspect of the present invention is intended to alleviate these image-altering structures in particular on at least one of the surfaces of the glass pane, but preferably both on the surface of the top side of the glass pane and on the surface of the bottom side of the glass pane.

The invention has surprisingly succeeded in reducing optical defects directly even during the hot forming of a glass pane without any need for subsequent surface processing of the glass pane. Thus, the data reported in the present case relate to hot-formed glass panes after singularization thereof, but which have not been subjected to surface processing either during hot forming or after hot forming in addition to the hot forming. The term “surface processing” encompasses mechanical, chemical and thermal treatment of the surface, which is especially suitable for smoothing the surface or alleviating elevations and depressions thereon, and methods of generating compressive and/or tensile stresses that are capable of increasing the strength of the processed surface, for example thermal or chemical pre-stressing.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
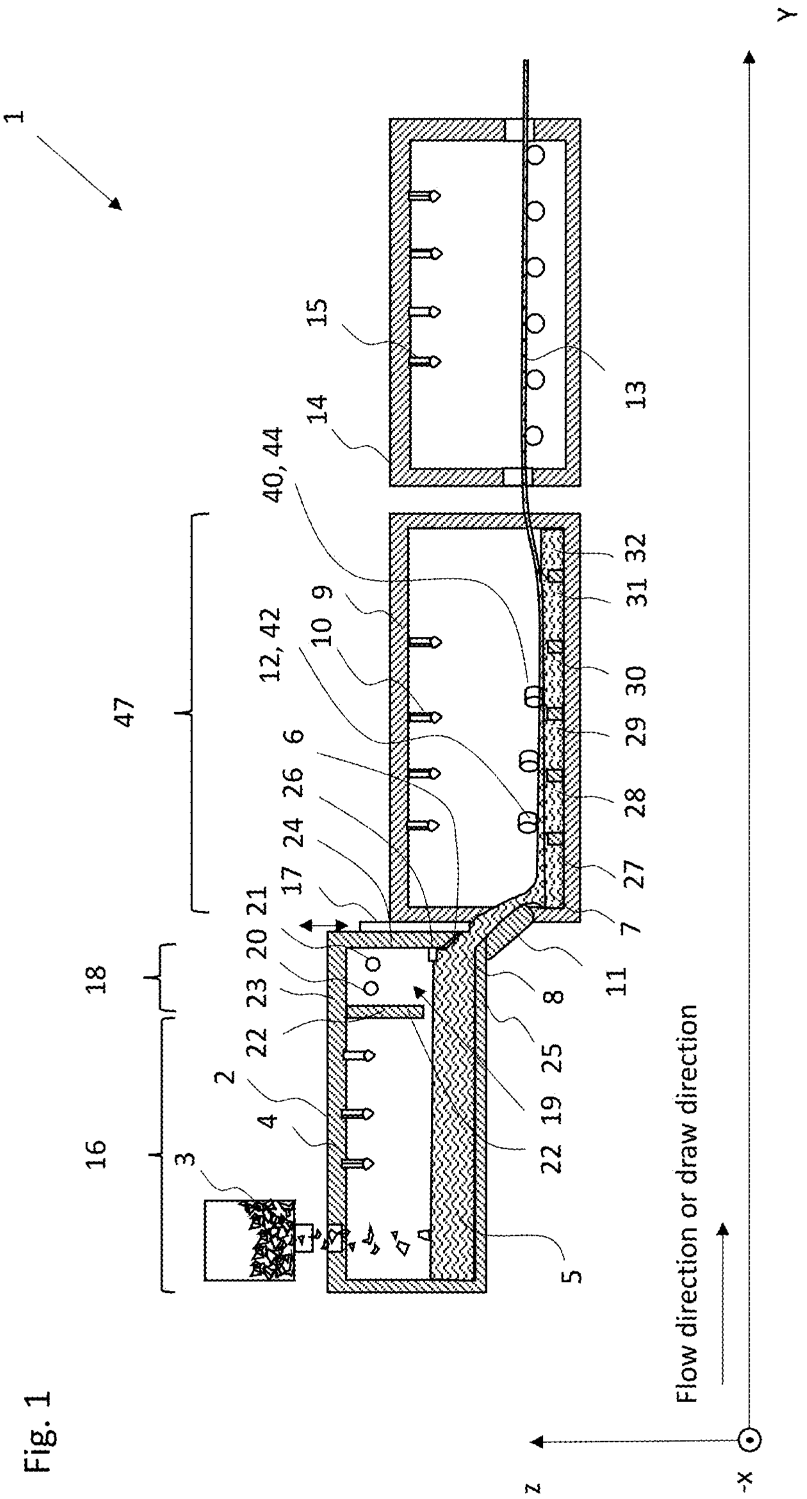
FIG. 1 is a schematic section view of an apparatus for production of a glass pane and for performance of the presently disclosed method, in which the section plane runs vertically through about the middle of the apparatus.

Optical refractions have beam- or wavefront-forming properties that can lead to optical defects and are also referred to in the present context as near-surface refractions. The term "near-surface refractions" thus refers to refractions created by the shape of the surface, but not to changes in refractive index that can likewise be caused within a glass pane, for example by inhomogeneities in the composition of the respective glass of the glass pane. Such near-surface refractions can affect the usability of a glass pane for defined applications, for example for high-resolution display devices, or even reduce the resolution capacity thereof. Where merely the term "refractions" is used by way of abbreviation in the context of the present disclosure, this term likewise refers in each case to near-surface refractions. In the presently disclosed glass panes, however, the refractions brought about by inhomogeneities and warpages, especially also wedge-shaped warpages, of the glass in the respective glass pane were so minor that these had virtually no effect on the near-surface refractions actually measured.

Such near-surface refractions can be detected, for example, by purely optical measurements. It is customary in the industry to use the ISRA VISION LAB SCAN-SCREEN 2D measurement system for this purpose in its "horizontal distortion" measuring arrangement.

This measurement in each case encompassed data detected line by line in parallel to the drawing direction used in the hot forming operation, where the respective measurement line extended parallel to drawing direction. Where the measurement of the near-surface refractions was undertaken at a tilt angle, the measurements detected here have been converted for a perpendicular direction of the incident light and correspondingly also reported for this perpendicular direction of the incident light. The 4/5/0 (angle/refraction/differentiation length) filter was used here for the data measured, with both surfaces of each glass pane, and hence the sum total of the refractions of the top side and bottom side, scanned at a tilt angle of 55°. A representation of the measurements obtained here can be found, for example, in FIGS. 6, 7*a* and 7*b* and FIG. 8.

The present invention relates to a glass pane, especially a glass pane comprising a borosilicate glass or composed of a borosilicate glass, having a thickness between at least 1.75 mm and at most 7 mm. The glass pane comprises a top side and a bottom side that each define a surface of the glass pane, where these surfaces extend essentially parallel to one another.

In one aspect of the invention, a glass pane is provided, especially a glass pane obtained by singularization from a preferably floated glass strip formed by hot forming, especially comprising a borosilicate glass, having a thickness D between at least 1.75 mm and at most 7 mm, comprising a top side and a bottom side, characterized by a magnitude of the sum total of refractions from the top side and the bottom side within a square area Mb of 500 mm by 500 mm for light incident perpendicularly on the glass pane for a 99.9% quantile of 0 mdpt to 1.7 mdpt in at least one direction parallel to the surface of the glass pane.

Figure 3:
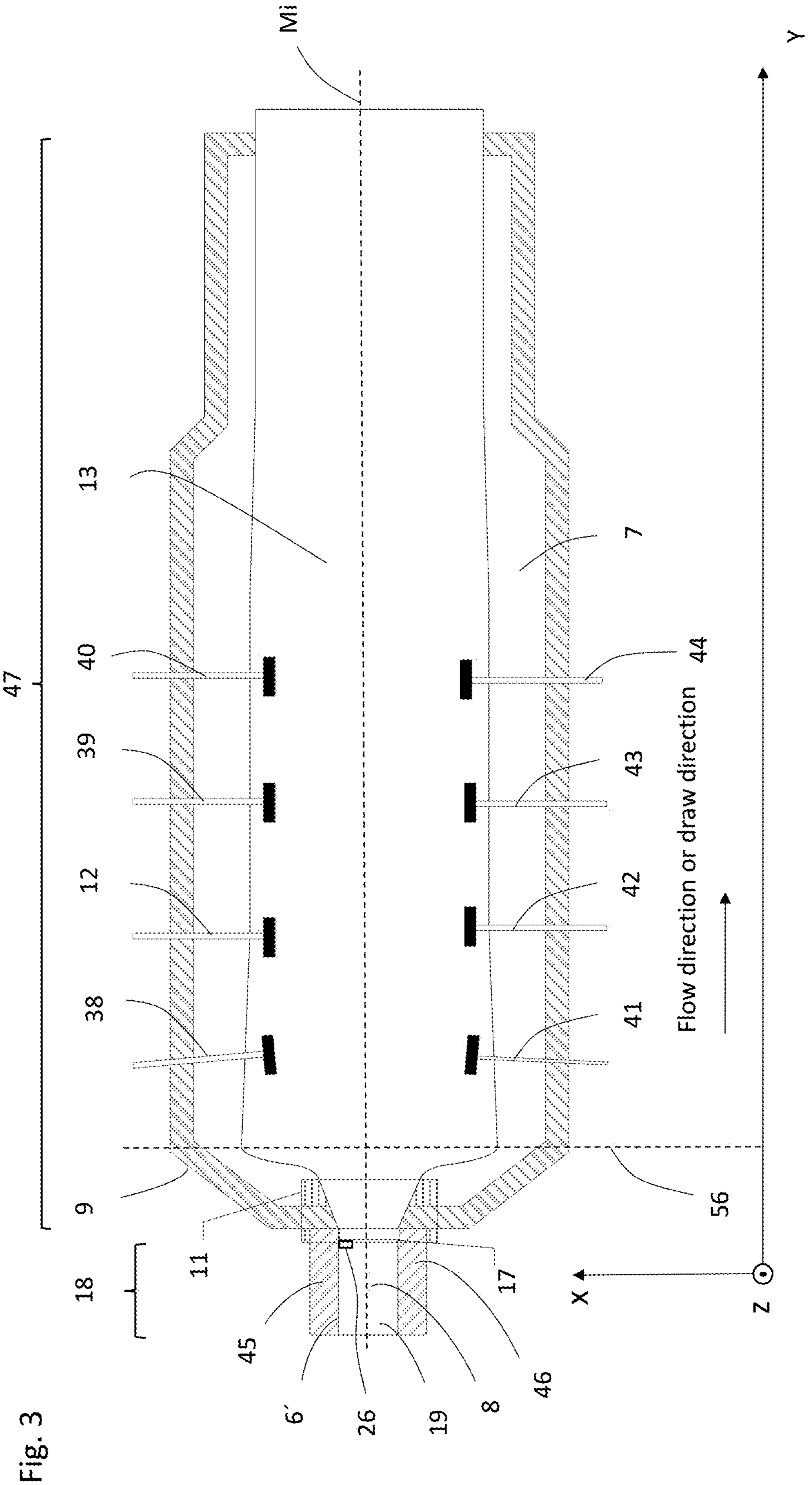
FIG. 3 is a schematic top view of a portion of the apparatus shown in FIGS. 1 and 2 for production of a glass pane, especially of a glass strip to be subjected to hot forming on a float bath, which shows, in order to simplify the illustration, by way of example, only some of the top rollers used overall.
Figure 4:
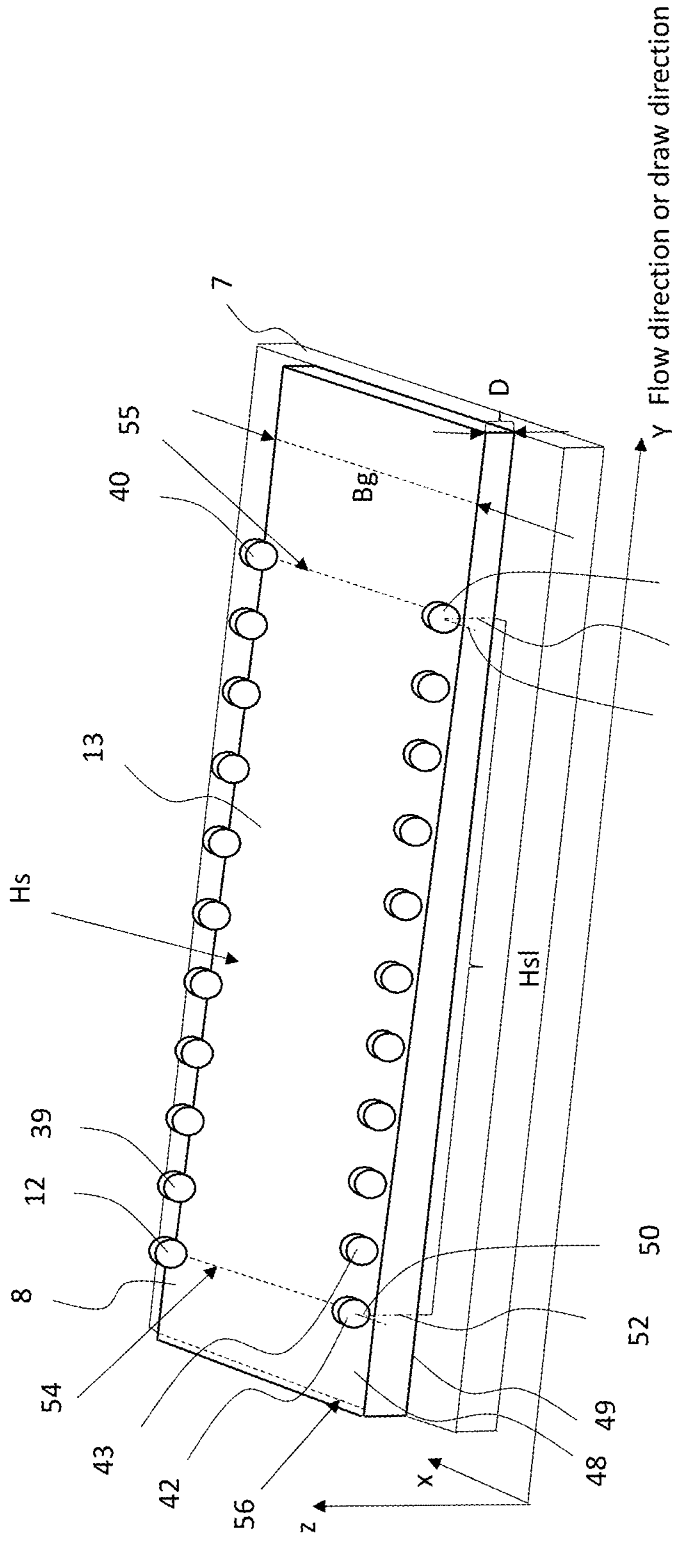
FIG. 4 is a top view, obliquely from above, of a portion of the apparatus shown in FIGS. 1 and 2 for production of a glass pane in the form of a section that extends between section planes A and B.
Figure 5:
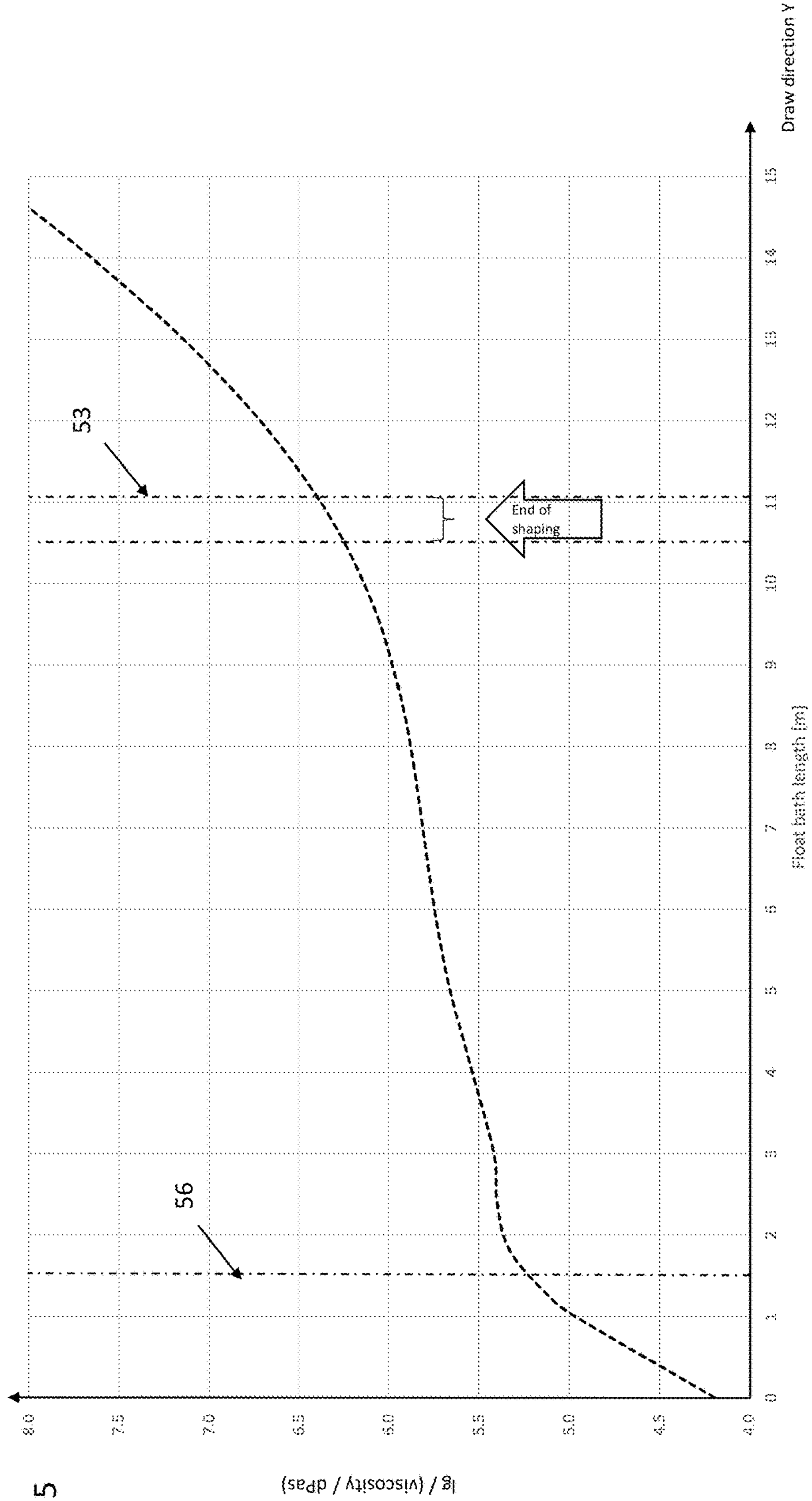
FIG. 5 is an illustrative diagram of presently disclosed viscosity profiles in which, in particular, the viscosity values $\eta_A$ at a distance from the component for throughput regulation at which the glass reached its maximum width after meeting the float bath and the viscosity values $\eta_E$ at the end of the hot forming section, and hence at the site of the perpendicular 53, can also be inferred.

The aforementioned at least one direction corresponded in each case to the Y direction of the Cartesian coordinate system shown in FIGS. 1 to 4, and thus ran parallel to the drawing direction Y used in the hot forming operation, in which the distance from a component for throughput regulation, the tweel or control valve, is also reported in each case, with the side of the tweel or control valve facing the float bath, as shown in FIG. 5, being at a location in drawing direction Y at a distance of zero metres and hence constituting the starting point for distance figures that are reported in each case for the middle Mi of the float bath based on X direction.

This at least one direction may be specified on the glass pane or a package of the glass pane in order to ensure maximum simplicity of further processing of the glass pane. Alternatively, this at least one direction may also be ascertained independently of any statement of the at least one direction, especially independently of the statement of "drawing direction", by measuring the respective direction with the lowest near-surface refractions.

In other words, according to the present disclosure, a glass pane is thus provided that has a particularly low level of optical defects that may be caused in particular by near-surface optical refractions.

This was not known as such to date. However, the low near-surface refractions of a glass pane according to the present application are particularly advantageous specifically for applications of the glass pane in electronic devices and displays, for example, where they can be used as cover pane. The glass panes according to the invention are also advantageously suitable for use as a glazing, especially as architectural glazing.

It is additionally advantageous, especially with regard to the scratch resistance and chemical stability of the glass pane, when this comprises a borosilicate glass comprising the following components in % by weight:

| | |
|---|---|
| $SiO_2$ | 70 to 87, preferably 75 to 85 |
| $B_2O_3$ | 5 to 25, preferably 7 to 14 |
| $Al_2O_3$ | 0 to 5, preferably 1 to 4 |
| $Na_2O$ | 0.5 to 9, preferably 0.5 to 6.5 |
| $K_2O$ | 0 to 3, preferably 0.3 to 2.0 |
| CaO | 0 to 3 |
| MgO | 0 to 2. |

Such a borosilicate glass achieves particularly good scratch resistance and chemical stabilities. In this way, it is also possible to obtain glasses having only a low coefficient of thermal expansion. The linear coefficient of thermal expansion in the range between 20° C. and 300° C. is preferably less than $5*10^{-6}$/K, but preferably at least $3.0*10^{-6}$/K.

More preferably, the glass pane in one embodiment takes the form of a float glass pane. In this way, it is possible to provide low near-surface refractions of at least one surface of one side of the glass pane, whereas, in the present context, beyond that, it is possible in each case to specify the sum total of the refractions of the two surfaces of a glass pane that extend essentially parallel to one another.

Correspondingly, the refractions were measured on the surface of the top side and the surface of the bottom side of the glass pane, and hence on the surface of the side remote from the tin bath during the hot forming in a float method and on the surface of the side of the glass pane facing the tin bath.

Advantageously, such a glass pane can be produced in a method according to a further aspect of the present disclosure. The present disclosure therefore also relates to a method of producing a glass pane, especially to a method of continuously producing a glass pane, especially a glass pane according to one embodiment, comprising the steps of: providing a batch comprising glass raw materials, melting the batch to obtain a glass melt, adjusting the viscosity of the glass melt, transferring the glass melt to a hot forming apparatus, especially by floating to form a glass strip, singularizing the hot-formed glass strip to obtain a glass pane, wherein the viscosity in the hot forming apparatus is adjusted such that the sum total of the decadic logarithms at the distance from a component for throughput regulation at which the glass reached its maximum width after meeting the float bath, lg ($\eta_A$/dPa*s), and at the end of hot forming, lg ($\eta_E$/dPa*s), is between at least 11.4 and at most 11.8.

In other words, the method according to the present disclosure includes a step in which the viscosity of the glass melt is adjusted such that the glass never goes below a particular minimum viscosity. On the contrary, the viscosity is controlled, for example in that the glass is cooled in a controlled manner before being transferred into the hot forming apparatus. However, quite a high viscosity is specifically established not only on commencement of the process; it is also advantageous here to specifically adjust the overall viscosity in the process, for which the sum of the decadic logarithms of the glass viscosity $\eta$ of the glass encompassed by the glass pane at the distance from a component for throughput regulation at which the glass reached its maximum width after meeting the float bath and at the end of the hot forming operation is a suitable measure. For this purpose, the decadic logarithm of the viscosity $\eta_A$, i.e., lg ($\eta_A$/dPa*s), at the distance from a component for throughput regulation at which the glass reached its maximum width after meeting the float bath and the decadic logarithm of the viscosity $\eta_E$, i.e., lg ($\eta_E$/dPa*s), at the end of the hot forming operation are determined, and the sum total of these values in the method is within the aforementioned limits, i.e., between at least 11.4 and at most 11.8. Since, in this sum total, the logarithmic values of the viscosities $\eta_A$ and $\eta_E$ are added up, hence forming lg ($\eta_A$/dPa*s)+lg ($\eta_E$/dPa*s), this also corresponds to the decadic logarithm of the multiplication of these viscosity values, lg ($\eta_A$/dPa*s)+lg ($\eta_E$/dPa*s)=lg ($\eta_A$/dPa*s*$\eta_E$/dPa*s). Where multiplication of the viscosity values $\eta_A$ and $\eta_E$, or viscosity values in general, is reported in the context of the present disclosure, for example in the legends of the appended figures, what shall also be disclosed in each case is the addition of the respective decadic logarithms thereof.

It was known to date to adjust the viscosity to a particular value at the start of the hot forming operation, and also to choose a comparatively low value. However, it has been found that considerable near-surface refractions were still obtained in this way. This is manifested especially in a more detailed consideration of the surface properties, especially in the consideration of the presently disclosed near-surface refractions, especially in or parallel to the drawing direction used in the hot forming operation.

The idea here was that a low-viscosity liquid is present in this way, which can compensate for any unevenness in the surfaces by flowing in the hot shaping process.

However, it has been found that, surprisingly, this is not the case. Instead, it surprisingly seems to be much more advantageous for the formation of particularly low refractions when the viscosity is at first specifically set at a high level. The mechanism behind this is not yet fully understood.

Furthermore, careful monitoring of the viscosity—and in a corresponding manner of the temperature regime—in the process is extremely advantageous. It has also been found that good, i.e., low, near-surface refractions can be achieved not solely by means of a specifically high initial viscosity. Instead, it is important for there to be an overall consideration of viscosity in the shaping process. One measure of this has therefore been found to be the sum total of the decadic logarithms at the distance from a component for throughput regulation at which the glass reached its maximum width after meeting the float bath and at the end of the hot forming operation. In the method, the viscosity is adjusted such that the sum total of the decadic logarithms of the viscosity at the distance from a component for throughput regulation at which the glass reached its maximum width after meeting the float bath and at the end of the hot forming operation is between at least 11.4 and at most 11.8.

"The distance from a component for throughput regulation at which the glass reached its maximum width after meeting the float bath" and the "end" of the hot forming are understood here at first to mean spatial delimitations of the method. The start of the thickness-based shaping or of the shaping zone Hs within which a defined thickness of the glass is established is the first top roller 12, 42, which is at the start of the second float bath section 28, also referred to as bay 2 or float bath section 2, but reached its maximum width at a different distance from the component for flow regulation by comparison with the distance at which the glass reached its maximum width after meeting the float bath. The first top roller is about 4.5 m away from the component for throughput regulation, the tweel, in flow direction or drawing direction Y. More specifically, the start of the thickness-based hot forming zone within which the glass undergoes its defined change in thickness is defined by the perpendicular 52 in negative z direction proceeding from the axis of symmetry 50 of the top roller 42 toward the upper surface 36, and hence toward the upper main surface 48 of the glass 8 to be hot-formed. However, the thickness-based hot forming, especially in a defined manner, is merely a part of the overall hot forming operation.

The end of the hot forming zone is determined by the last top roller 40, 44, which exerts a shaping effect on the glass strip to be hot formed in flow direction or drawing direction, and is about 10.5 m to 11.1 m away from the component for throughput regulation, the tweel 17, in flow direction or drawing direction Y. More specifically, the end of the hot forming zone is defined by the perpendicular 53 in negative z direction proceeding from the axis of symmetry 51 of the last shaping top roller 44 toward the upper surface, especially toward the main surface 48, of the glass 8 to be hot-formed. The aforementioned top rollers 12 and 42, and 40 and 44, are also readily apparent, for example, on the appended FIGS. 3 and 4.

The lower surface or lower main surface 49 of the glass to be hot-formed lies on the float bath 7 during the hot forming operation.

Advantageously, in one embodiment, the viscosity is adjusted such that the decadic logarithm of the viscosity at the distance from a component for throughput regulation at which the glass reached its maximum width after meeting the float bath is thus, especially at a distance in drawing direction Y from a component for throughput regulation, the tweel, of 1.5 m and especially at the start of a second float bath section (or float bath section 2), at least 5.0, more preferably at least 5.1, and preferably less than 5.25, and, preferably, the decadic logarithm at the end of the hot shaping, especially at a distance in drawing direction of about 10.5 m to 11.1 m downstream of the component for flow regulation, the tweel, and especially at the start of a fourth float bath section, is at least 6.2, preferably at least 6.3, more preferably at least 6.35, a preferred upper limit being at most 6.5.

The inventors are of the view that, contrary to what has been suspected to date, optical refractions can be reduced in particular by conducting specifically a relatively cold hot forming operation, especially at the start. It was assumed to date that specifically a hot mode of operation, especially in the region of a glass production unit in which the glassy material is transferred from a melting unit in a region for hot forming, is advantageous in the reduction of near-surface refractions.

In fact, it has been found that a "hot mode of operation", i.e., a mode of operation in which the viscosity at the start of the hot forming process is low and, for example, is much less than $10^{5.0}$ dPa*s, can reduce elevations extending longitudinally that occur essentially in the direction of drawing of a float glass, which are also referred to as drawing streaks. These drawing streaks form cylindrical-lenticular structures that extend effectively in drawing direction, the refractions of which are then manifested essentially perpendicular to drawing direction. However, it has been found that these drawing streaks, i.e., fluctuations in thickness of the glass strip occurring transverse to drawing direction that extend in drawing direction, are not the cause of the presently addressed near-surface refractions. Instead, there are further phenomena that are superposed on the forming of drawing streaks and are essentially unaffected by measures that merely suppress the formation of drawing streaks.

In this consideration, it has been found that, surprisingly, in methods in which the viscosity of the glassy material at the distance from a component for throughput regulation at which the glass reached its maximum width after meeting the float bath is specifically set at a low level, i.e., for example, at below $10^{5.0}$ dPa*s, the resulting glass strip does have fewer drawing streaks, but other surface structures, especially surface structures that occur in drawing direction and develop refractions running in drawing direction, can appear to an enhanced degree. These are structures of small area that do not lead to elevations or depressions parallel to drawing direction (as in the case of the so-called drawing streaks), but form irregular structures that are reminiscent of a leopardskin or "orange skin". Such structures are shown by way of example in FIG. 7*a* and FIG. 7*b* with the near-surface refractions that result from these structures as the sum total of the refractions both on the top side and the bottom side for a glass pane according to the invention and a conventional glass pane. With the invention, it was possible to considerably reduce the level of such structures and hence near-surface refractions created by these structures, as can also be inferred by way of example from the diagram in FIG. 7*b*. To the extent that the representation of this measurement area Mb in the respective upper images of FIGS. 7*a* and 7*b* does not correspond to a square, this is merely a change in the image scale in Y direction that has been essentially corrected in the respective lower images of FIGS. 7*a* and 7*b*, but does not constitute a departure from the actual measurement area Mb.

It is consequently not the case, as previously thought, that the adjustment of the viscosity at the start of the hot forming operation is the only important factor for the overall improvement in surface characteristics once again in glass strips or glass panes produced in this way (after singularization). Rather, it is particularly advantageous to consider the overall viscosity during the hot forming operation. It has been found that the viscosity at the distance from a component for throughput regulation at which the glass reached its maximum width after meeting the float bath and at the end of the hot forming operation is a good measure for the assessment of the method. A simple measure that can serve for assessment of the process may be the sum total of the decadic logarithms of the viscosity at the distance from a component for throughput regulation at which the glass reached its maximum width after meeting the float bath and at the end of the hot forming operation. In the method, the sum total of the decadic logarithms of the viscosity at the distance from a component for throughput regulation at which the glass reached its maximum width after meeting the float bath and at the end of the hot forming operation is between at least 11.4 and at most 11.8.

Preferably, the decadic logarithm of the viscosity is therefore, at the end of the hot forming operation, especially at the start of a fourth float bath section, at a distance of about 10.5 m to 11.1 m from a component for throughput regulation of the flow of the glass to be hot-formed, at least 6.2, preferably at least 6.3, more preferably at least 6.35, where a preferred upper limit is at most 6.5. At this point in the hot forming operation, i.e., for example, at the end of a fourth float bath section, the glass strip in a hot forming method does not contract as strongly as before, such that, by means of what are called border rollers or top rollers, the drawing is mainly in drawing direction there, and its magnitude is inversely proportional to the glass strip temperature.

Although this is the case in principle, it has been found that, specifically also when the viscosity of the glass strip even at the distance from a component for throughput regulation at which the glass reached its maximum width after meeting the float bath, especially upstream of a component for throughput regulation and/or at the start of a first float bath section, is at least 5.0, more preferably at least 5.1, and less than 5.25, there must be strong drawing by the top rollers, specifically also a last top roller. At this point, a draw is then preferably applied in drawing direction. However, the top rollers are preferably at an outward angle of up to 15° in the middle of the hot forming. The high viscosity at the end of the shaping prevents the narrowing (contracting) of the glass strip, for example also by virtue of the tension of the annealing lehr rolls.

In general, a "cold" mode of operation at least at the start of the hot forming in glass production has been considered to be unfavourable to date. The reason for this is not only that the process of producing, especially of hot forming, should then be more closely monitored overall, but also that only a comparatively low throughput is possible in this way.

In such a method, especially a continuous method, a glass strip is obtained, which can then be processed further after leaving a lehr. In particular, it is possible here then to singularize this glass strip to a glass pane.

Advantageously, the method according to the present disclosure can be conducted in one embodiment in plants designed for a throughput of less than 400 t of glass per day, preferably less than 200 t of glass per day and more preferably less than 100 t of glass per day.

This is because the method is run "cool", i.e., with comparatively high viscosity, not just over and above a distance from the component for throughput regulation at which the glass reached its maximum width after meeting the float bath, but the viscosity is also adjusted in a very defined manner at the end of the hot forming. This, as set out, is extremely advantageous for establishment of particularly low near-surface refractions. The temperature in the hot shaping process is generally adjusted using heating units. However, in the case of particularly cool running, it should be taken into account that the glassy material itself also transports heat. Over and above a particular throughput, it may therefore be necessary with further-increasing throughputs to withdraw heat from the glassy material itself, for example by means of special devices for cooling such as fans or the like. This means not just extra apparatus complexity and correspondingly higher costs, but can also have the effect that further properties are imposed on the glassy material or glass strip, for example thermal stresses.

If, however, the throughput is limited, for example as specified above, removal of the heat transported by the glassy material itself is more easily possible, for example via the adjustment of the temperature of the tin bath in the respective float bath sections. Process regimes in assemblies with comparatively low throughputs therefore have particularly good capability to produce glass panes having advantageously low near-surface refractions, especially when the presently disclosed method is employed therein.

It is advantageous when the adjusting of the viscosity of the glass melt is also undertaken prior to the transfer to the device for hot forming upstream of a spout or at the site of a spout.

EXAMPLES

Particularly advantageously, the method described can be used to produce glass panes from or comprising a borosilicate glass. Illustrative compositions may be within the following composition range, given in % by weight based on oxide:

| | |
|---|---|
| $SiO_2$ | 70 to 87, preferably 75 to 85 |
| $B_2O_3$ | 5 to 25, preferably 7 to 14 |
| $Al_2O_3$ | 0 to 5, preferably 1 to 4 |
| $Na_2O$ | 0.5 to 9, preferably 0.5 to 6.5 |
| $K_2O$ | 0 to 3, preferably 0.3 to 2.0 |
| CaO | 0 to 3 |
| MgO | 0 to 2. |

In particular, the glass in the glass pane may comprise the following components in % by weight based on oxide:

| | |
|---|---|
| $SiO_2$ | 70 to 86 |
| $Al_2O_3$ | 0 to 5 |
| $B_2O_3$ | 9 to 25 |
| $Na_2O$ | 0.5 to 5 |
| $K_2O$ | 0 to 1. |

In addition, the glass in the glass pane may comprise the following components in % by weight:

| | |
|---|---|
| $SiO_2$ | 77 to 80 |
| $Al_2O_3$ | 2 to 5 |
| $B_2O_3$ | 9 to 11 |
| $Na_2O$ | 2.6 to 5.2 |
| $K_2O$ | 0.5 to 2.5 |
| MgO | 0 to 2 |
| CaO | 1.2 to 2.7 |

In the description of preferred and particularly preferred embodiments that follows, reference numerals that are the same in the various figures denote identical constituents, or constituents that have the same effect, of the apparatus respectively disclosed here.

The figures for thickness D of the glass pane 33 correspond to the distance between the two main surfaces, i.e., the top side 34 and the bottom side 35 of the glass pane 33 after a hot forming thereof, and should each be measured perpendicular to these main surfaces, as illustrated by way of example in FIG. 4.

Figure 2:
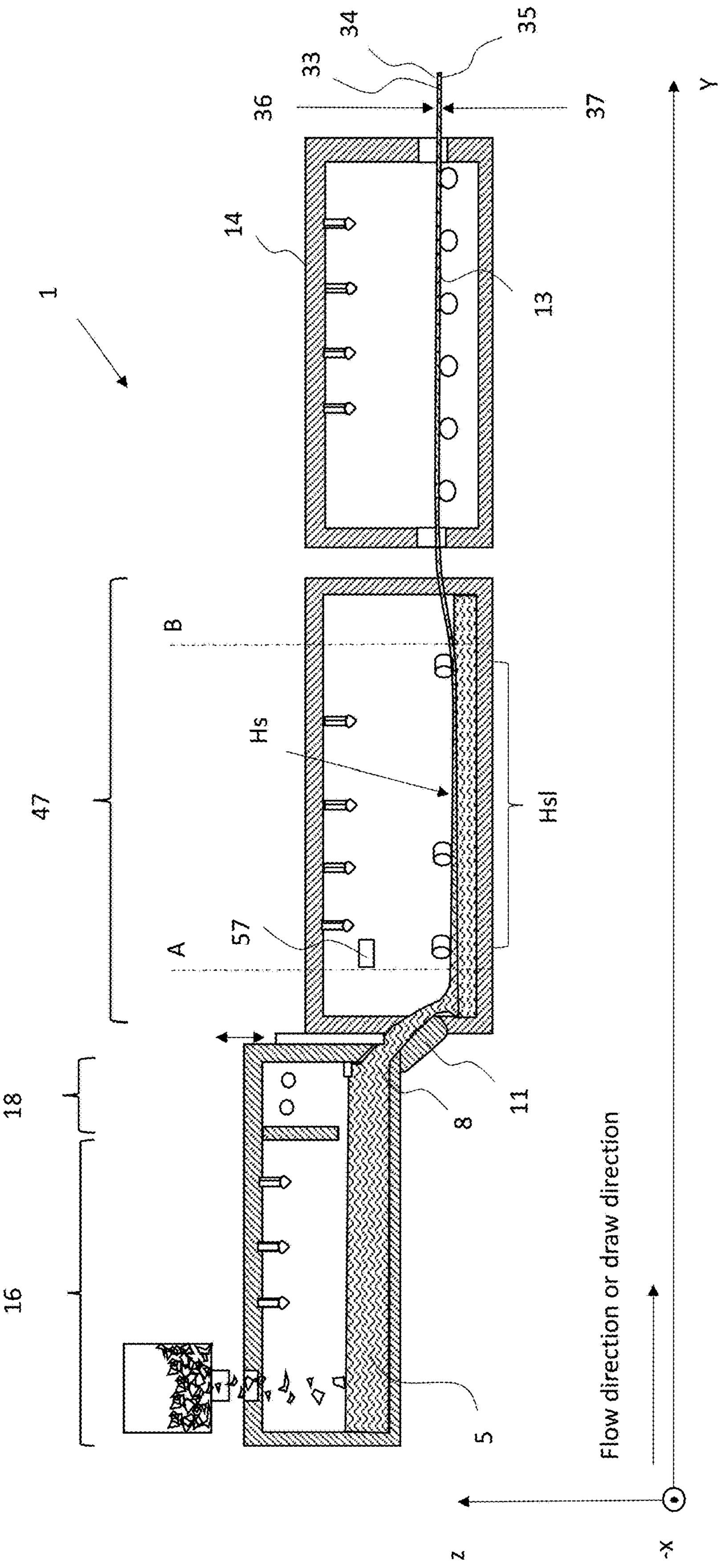
FIG. 2 is a schematic section view of FIG. 1 in greatly simplified form, in which the section shown in FIG. 4 is marked by section planes A and B.

The float apparatus shown in FIGS. 1, 2 and 3 for performance of the presently disclosed method has a melting furnace 2 also referred to as melt tank, which is supplied in a known manner with a batch to be melted, specifically glass batch 3, and heated with burners 4 until a glass melt 5 of the desired composition is formed. Further devices for homogenization of the glass melt are known to the person skilled in the art and will consequently not be described in detail.

Through a canal 6, the molten glass of the glass melt 5, generally under the influence of gravity, reaches a float bath 7 comprising liquid tin, and on which the glass 8 to be hot-formed can spread out laterally with reduction of its height under the influence of gravity as part of the hot forming operation thereon.

In order to adjust the temperature of the glass to be hot-formed, the tin bath 7 may be disposed in a float bath furnace 9 that has electrical roof heaters 10, by means of which the temperature of the glass to be hot-formed is adjustable. In addition, the temperature of the tin bath 7 may be adjusted in a defined manner in drawing direction, and in this way the temperature of the glass to be hot-formed and hence the viscosity thereof can be influenced in a defined manner.

When it leaves the melt tank 2, the molten glass 8 to be hot-formed is directed onto the tin bath 7 via an inlet lip 11 that runs obliquely downward, also referred to as spout, on which it already begins to spread out. At a distance of 1.5 m from the component for throughput regulation, and hence a distance of 1.5 m in Y direction in the middle Mi of the glass strip 13 with respect to X direction, the glass strip 13 has its greatest width, meaning its greatest extent in X direction. This distance in the embodiments disclosed is about 1.5 m and is indicated by reference numeral 56 in FIG. 4, for example. Roll-shaped top rollers 12 as drawing device influence, in a defined manner, the further movement of the glass strip 13 that forms on the tin bath 7 in its spreading movement from the side. FIG. 1 shows, by way of example, merely three top rollers in each case, but it is also possible if required for there to be more than two of these top rollers for use, as can also be inferred, for example, from FIGS. 3 and 4.

Top roller refers to an essentially roll-shaped body that is well known to the person skilled in the art in this field, which is in contact by its outer annular shoulder with the main surface remote from the tin bath or upper surface 48 of the glass 8 to be hot-formed and exerts a force on the glass 8 to be hot-formed in each case by a rotating movement in each case about its longitudinal axis or axis of symmetry 50, 51. This axis of symmetry 50, 51 is shown merely by way of example for the top rollers 42 and 44. In the context of the present disclosure, the term "top roller" may also be regarded as an essentially roll-shaped transport apparatus for the glass to be hot-formed. In this context, the first top roller 12, 42 constitutes an essentially roll-shaped transport apparatus for the glass to be hot-formed at the start of the section Hs, especially a defined, thickness-based hot forming zone, and the last top roller 40, 44 constitutes an essentially roll-shaped transport apparatus for the glass to be hot-formed at the end of section Hs of the hot forming zone. Over the course of this thickness-based hot forming zone Hs, the thickness of the glass strip 13 is adjusted in a defined manner, but this hot forming zone Hs does not include all hot-forming measures, since, even after the distance 56 from the component for throughput regulation at which the glass reached its maximum width after meeting the float bath up to the start of section Hs, there is already forming of the glass 8 to be hot-formed in the glass strip 13.

The portion of the glass 8 to be hot-formed which is in contact with the outer annular shoulder of the respective top roller causes it to move in a defined manner. The top roller is in each case driven in a defined manner, being controllable by motor with an essentially rod-shaped axle.

The location or position of the top roller, especially in flow direction Y of the glass 8, is understood in the context of the present disclosure in each case to be the perpendicular 52, 53 in negative z direction proceeding from the respective axis of symmetry 50, 51 of the corresponding top roller 42, 44 from the surface, especially from the main surface 48 of the glass 8 to be hot-formed.

The location or position of the respective first top roller 12, 42 defines the entry of the glass 8 into the section Hs for hot forming thereof with regard to its thickness.

The location or position of the respective last top roller 40, 44 defines the exit of the glass 8 from the section Hs for thickness-based hot forming thereof and hence for overall hot forming thereof.

By way of simplification, in the context of the present disclosure, the mention of the first top roller in each case refers to the pair of top rollers, for example the top rollers 42, 12, that are at the same site in flow direction, and the mention of the last top roller in each case refers to the pair of top rollers, for example the top rollers 44, 40, that are at the same site in flow or y direction.

The site of entry of the glass 8 into the section Hs for thickness-based hot forming is consequently apparent by virtue of the dotted line 54, whereas the site of exit of the glass 8 from the section Hs for hot forming is indicated by the dotted line 55.

A further dotted line indicates the site or distance 56 from the component for throughput regulation at which the glass 8 to be hot-formed has reached its maximum width after meeting the float bath 7.

The length Hsl of the section Hs for thickness-based hot forming in the context of the present disclosure is understood to mean the distance in flow or y direction between the perpendicular 52 of the first top roller 42 and the perpendicular 53 of the last top roller 44.

After hot forming thereof, the glass strip 13 can optionally be transferred to a lehr 14, which may likewise have electrical roof and floor heaters 15, in order to subject the glass strip 13 to a defined lowering of temperature, although only roof heaters are shown by way of example in FIG. 1.

After leaving the lehr 14, the glass strip 13 is then available for further processing, especially singularization into glass panes 33.

In order, in the description of preferred embodiments that follows, to be able to more clearly illustrate spatial arrangements of different assemblies or of properties, for example of glasses to be hot-formed or glass panes 33 singularized after hot forming, reference is firstly made to the Cartesian coordinate system shown in FIGS. 1, 2, 3 and 4, which defines an orthogonal X, Y and Z direction, to which all statements in the various figures continue to relate hereinafter.

The X and Y directions form a plane that extends horizontally and hence also runs essentially parallel to the surface of the tin bath 7. Running perpendicular to this plane, Z direction extends upward and thereby also defines the normal direction in relation to the glass strip 13.

Reference is made hereinafter to FIG. 1, which, as an apparatus for production of a glass strip 13 from which the presently disclosed glass panes 33 can be singularized, comprises the float apparatus that has been given the reference numeral 1 as a whole, which has all the devices or apparatuses described with reference to FIGS. 2, 3 and 4.

Devices for melting 16 that are included here are the melt tank or melting furnace 2, a feed device for the glass batch 3, and the burners 4. In addition, the melt tank 2 has a canal 6 for transfer of the molten glass 8 to be hot-formed to the tin bath 7.

By way of example, the control valve 17, i.e., the component for throughput regulation of the glass flow, which is also referred to as tweel, is disposed beyond the canal 6. By movement of the control valve or tweel 17, which forms the component 17 for throughput regulation, in the direction of the double-headed arrow shown alongside reference numeral 17, it is possible to constrict or enlarge the cross section of the canal 6, which regulates, and especially adjusts in a defined manner, the amount of molten glass 8 to be hot-formed that exits from the melt tank 2 per unit time. In addition, a feeder may be disposed between the melt tank 2 and the float bath furnace 9, especially upstream of the tweel 17, which in this case forms the canal 6, especially also over a longer distance than that shown in FIG. 1. A more detailed description of throughput regulation can be found in this applicant's DE 10 2013 203 624 A1, which is also incorporated into the subject-matter of the present application by reference.

Viewed in flow direction of the molten glass 8 to be hot-formed, a device 18 for defined adjustment of the viscosity of the molten glass 8 to be hot-formed is disposed upstream of the component for throughput regulation 17 and upstream of the spout 11.

This device 18 for defined adjustment of viscosity comprises a chamber 19 that is divided from the melt tank 2 or else may form part thereof, and accommodates the molten glass 8 to be formed to a glass substrate for defined adjustment of the viscosity thereof.

In addition, the device 18 for defined adjustment of viscosity comprises regions 20, 21 through which fluid flows, especially regions through which water flows, which absorb heat from the glass 8 to be hot-formed and may take the form of a metallic pipe system. This metallic pipe system may also be coloured for better absorption of heat or provided with a heat-resistant paint on the surface thereof.

Alternatively or additionally, the walls 22, 23, 24 and 25 of the chamber 19 may absorb heat from the glass 8 to be hot-formed in that the temperature thereof is adjusted in a defined manner, for example by further cooling devices.

The chamber 19, with its walls 22, 23, 24 and 25, may also be formed spatially separately from the melt tank 2 and have high-temperature-resistant metallic walls, in order to provide improved dissipation of heat.

As described above, the device 18 for defined adjustment of viscosity comprises at least one cooling device by means of which the temperature and hence also the viscosity of the glass 8 to be hot-formed is adjustable in a defined manner.

Contactless and, alternatively or additionally, direct temperature measurements in contact with the glass to be measured are known to the person skilled in the art. Corresponding sensors are described, for example, by the sensory device or unit 26 in the context of this disclosure.

The sensory device or unit 26 may be in direct contact with the glass and hence undertake a direct temperature measurement, or else may comprise a radiative measurement device that detects the temperature by detection of the spectrum emitted by the glass 8 to be hot-formed with reference to the spectrum itself and/or the intensity of the radiation emitted.

The apparatus 1 comprises a device or apparatus 47 for hot forming, which will be described in detail hereinafter, which is present beyond the device 18 for defined adjustment of viscosity in flow direction or drawing direction and receives the glass 8 to be hot-formed via the spout 11.

The spout 8 directs the glass 8 to be hot-formed onto a tin bath 7 accommodated in the float bath furnace 9.

A further cooling device 57 is disposed above the glass 8 to be hot-formed at a distance from the component for throughput regulation 17 of about 2 m based on the middle thereof in Y direction. This cooling device 57 projects above the melt and may have a width in Y direction of 300 mm, a height in Z direction of 80 mm and a length in X direction of 2.5 meters, and may be in two-part form. In this case, a portion of the cooling device 57 projects over the glass to be hot-formed from respective opposite sides in X direction, and hence constitutes an essentially complete cover of the glass 8 to be hot-formed in X direction and regionally in Y direction.

The cooling device 57 shadows the glass 8 to be hot-formed not just with respect to the roof heaters 10, but also brings about a cooling air stream that comes from above the glass 8, with which it is possible to cool the glass 8 present beneath the cooling device 57 down by about 20 to 25 K. In this way, given the already initially high viscosity of the glass 8, it is possible to create a flatter progression of the viscosity curve overall in the continued progression in drawing direction, as also shown by way of example in FIG. 5.

Above the glass strip 13 that forms on the tin bath 7, as also readily apparent from FIG. 3, further top rollers 38 to 44 are disposed alongside the top roller 12 for mechanical movement of the glass strip 13.

In this context, the number of top rollers shown in FIG. 3 is merely illustrative since, in preferred embodiments of the invention, preferably 10 to 12 pairs of top rollers are used.

The top rollers 41 and 38 serve merely for adjustment of the width of the glass strip Bg 13 that results from the hot forming operation, and are optional since the width Bg is also adjustable in other ways, for example by regulating the volume of glass 8 which is provided for hot forming.

FIG. 3 also shows an alternative or additional configuration of the device 18 for defined adjustment of viscosity. The molten glass 8 is present in a canal 6 of the melt tank 2 (not shown in FIG. 3) to the float bath furnace 9. The walls 45, 46 of the canal 6 have been formed from a metal of high thermal stability, for example platinum, which may also be disposed as a metallic layer on a mineral refractory material. The defined adjustment of the temperature of these walls allows heat to be withdrawn from the glass 8, and also the temperature and viscosity thereof to be adjusted in a defined manner. In this embodiment too, the above-described sensory unit 26 may preferably be disposed close to the tweel 17.

A drawing device has been described above for the apparatus 47 for hot forming, which comprises a float device, especially a float bath furnace 9 with a tin bath 7.

The method disclosed here is described by way of example hereinafter with reference to a float method.

FIG. 4 shows a section extending between the section planes A and B of the apparatus 1 for production of a glass strip 13 for a glass pane 33 to be singularized therefrom, in which, for better clarity, only the glass 8 to be hot-formed, and also the float bath 7 in the form of a tin bath are shown.

The glass 8 moves from the left-hand side of FIG. 4 at an entry speed onto the first top roller 42, 12, at which the thickness-based hot forming disclosed here to give a glass strip 13 for a glass pane 33 to be singularized therefrom commences. This speed corresponds to the speed of the glass 8 at the first top roller 42, 12. The glass 8, after the last top roller 40, 44, and hence after it has been hot-formed as described here, thus moves onward in flow direction to a glass strip 13 for a glass pane 33 with an exit thickness D to be singularized therefrom.

Where reference is made for short merely to hot forming in the context of the present disclosure, this refers, for linguistic simplicity, to the hot forming described in more detail hereinafter to give a glass strip 13 for a glass pane 33 to be singularized therefrom, especially after cooling of the glass strip 13, both along the section Hs of the thickness-based hot forming zone and further hot forming steps that may have already taken place before attainment of the first top roller, as, for example, in the pouring of the glass 8 onto the float bath 7, where the glass can spread out two-dimensionally and assume its equilibrium thickness Dg of about 7 mm+/−1 mm.

After the hot forming, the glass 8 has an exit thickness of D that it assumed after the last top roller 40, 44.

The glass 8, throughout its thickness-based hot forming to give a glass strip 13 for a glass pane 33 to be singularized therefrom, between the first top roller 42, 12 and the last top roller 40, 44, and hence in the section Hs, has a width Bg, i.e., an extent in x direction of Bg, which is altered preferably by less than 3% in this thickness-based hot forming in x direction. This can be ensured by adjusting the speed and angle of rotation along the axis of symmetry (axis of rotation) of the respective top rollers. In this case, it is especially also possible to alter the angle of the respective axis of symmetry of the corresponding top roller such that this results in greater or lesser contributions of the movement of the glass 8 to be hot-formed or of parts of the glass strip 13 in x direction in the course of transport of glass 8 to be hot-formed, especially along the thickness-based hot forming zone Hs.

At a distance 56 from a component for throughput regulation 17 at which the glass reached its maximum width after meeting the float bath, the viscosity $\eta_A$, especially by adjustment of the temperature of the glass strip 13 at this site, is adjusted such that this has a value of lg ($\eta_A$/dPa*s) of at least 5.0, more preferably at least 5.1, and less than 5.25.

At the end of the hot forming zone Hs, the viscosity $\eta_E$, especially by adjustment of the temperature of the glass strip 13 at this site, is adjusted such that this has a value of lg ($\eta_E$/dPa*s) of at least 6.2, preferably at least 6.3, more preferably at least 6.35, where a preferred upper limit assumes the value of 6.5 at most.

According to the invention, the viscosity in the apparatus for hot forming is adjusted such that the sum of the decadic logarithms of the viscosity lg ($\eta_A$/dPa*s) and lg ($\eta_E$/dPa*s) at the distance 56 from a component for throughput regulation 17 at which the glass reached its maximum width after meeting the float bath, and at the end of the hot forming, is between at least 11.4 and at most 11.8 $\eta$ dPa*s.

An illustrative representation of corresponding viscosity progressions can be seen in FIG. 5, in which, in particular, the viscosity values $\eta_A$ at the distance 56 from a component for throughput regulation 17 at which the glass reached its maximum width after meeting the float bath, and the viscosity values $\eta_E$ at the end of the hot forming zone, and hence of the perpendicular 53, can also be inferred.

Figure 6:
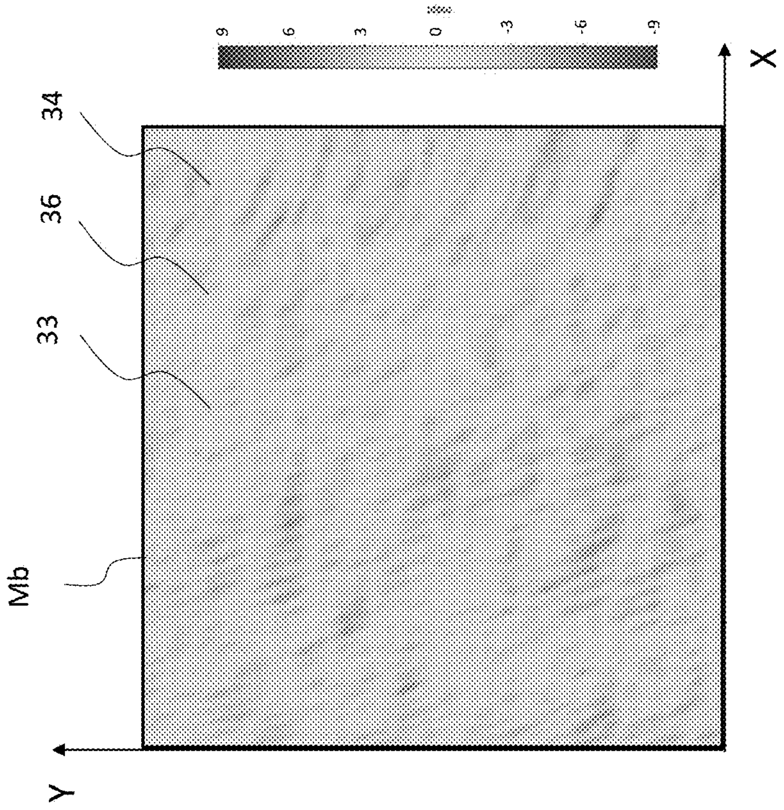
FIG. 6 is a top view of the upper surface, remote from the tin bath in the hot forming operation, of a glass pane produced by the presently disclosed methods, showing the sum total of the near-surface refractions thereof both on the top side and the bottom side of the glass pane in a measurement area Mb which is shown merely by way of example and not true to scale, in order to ascertain the near-surface refractions at a tilt angle of 55°.

FIG. 6 is a top view of the upper surface remote from the tin bath in the hot forming operation, or main surface 48, of a glass pane 33 produced by the presently disclosed method with a measurement area Mb shown merely by way of example and not to scale for ascertainment of the near-surface refractions at a measurement angle of 55°. FIG. 6 shows the near-surface refractions achievable by the presently disclosed methods with their respective values, which will be elucidated in more detail hereinafter with reference to FIGS. 7*a* and 7*b*. The measurement area Mb here covered, adjoined or had a distance of less than about 200 mm from, the middle of the glass strip to be hot-formed in X direction.

The optical refraction P(x,y) of a surface of a glass pane with elevations z(x, y) in Z direction with height H on a surface of the glass pane is the result found when this is determined along a straight line running in Y direction at a fixed value of x for light incident perpendicularly on the surface in a manner customary for measurements of refraction:

$$P(y) = (n-1)\kappa(y) = (n-1)\frac{z''(y)}{\left(1+z'(y)^2\right)^{3/2}}$$

where n represents the refractive index of the glass pane analysed and had a value of 1.471 in each case for the glass pane analysed, z'(y) and z"(y) represent the first and second derivatives of the extent z(y) in Y direction, i.e., in drawing direction, and z(y) is the extent in z direction at the site y given an assigned, in particular fixed, value of x.

It is thus possible in principle, with known refractive index n of the glass pane, to convert even z(x, y) values obtained by profilometric measurement methods to refractions, especially refractions running in Y direction as described above. Since the above calculation of optical refraction includes only one surface, however, in order to arrive at the presently disclosed values from the geometric data for the surfaces, it is necessary to calculate and add the refractions from both sides, i.e., the top side and bottom side of the glass pane. It is thus not possible either for the specification of the refraction of a surface of a glass pane or for a structure of a surface of a glass pane to reflect the present measurements, where both surfaces in each case of the glass pane analysed are included and reported as a sum total.

However, it has been customary in the industry to use the ISRA VISION LABSCAN-SCREEN 2D optical measurement system with the 4/5/0 (angle/refraction/differentiation length) filter for the actual measurement, with which both the refractions of the top side and of the bottom side of the glass pane singularized from the glass strip have been measured simultaneously. The measurement in each case comprised data detected line by line in the drawing direction used in the hot forming operation, where the respective measurement line extended in drawing direction.

If, however, this refraction is determined for light incident obliquely on the surface of the glass, the refractions are enhanced as a function of the tilt angle Φ in accordance with the following equation 1:

$$P(\Phi) = \frac{F(\Phi)}{(n-1)\cos(\Phi)}\text{., where}$$

$$F(\Phi) = \frac{\sqrt{n^2 - \sin(\Phi)^2}}{\cos(\Phi)} - 1$$

P=relative optical strength through tilting

Φ=tilt angle n=refractive index of glass

The angle of tilt Φ=55° resulted here in enhancement of the optical refractions measured by a factor of 4.2, which increases the accuracy of the assessment in tilt direction. The measurement positions were recalculated for an untilted glass pane and hence correspond to the real glass pane. This means that, for light incident perpendicularly on the glass pane, only refractions of the top side of the glass pane are added to the refractions of the bottom side of the glass pane, which are lower by a factor of 4.2.

Measurements on tilted glass panes are known to the person skilled in the art, for example from DIN 52305 or EN 572-2, relating to methods in the determination of optical quality of float glass for the measurement of the zebra angle at flat glass. In a similar manner to the description in that standard, the glass panes were tilted by the angle $\alpha=55°$ relative to the normal of the upper surface of the glass pane, with tilting of the glass pane in the direction perpendicular to drawing direction, and hence in X direction. The tilt axis, i.e., the axis about which the pane is rotated, is in the plane of the glass pane perpendicular to drawing direction, which then results in enhancement of lens effects in drawing direction.

Figure 7B:
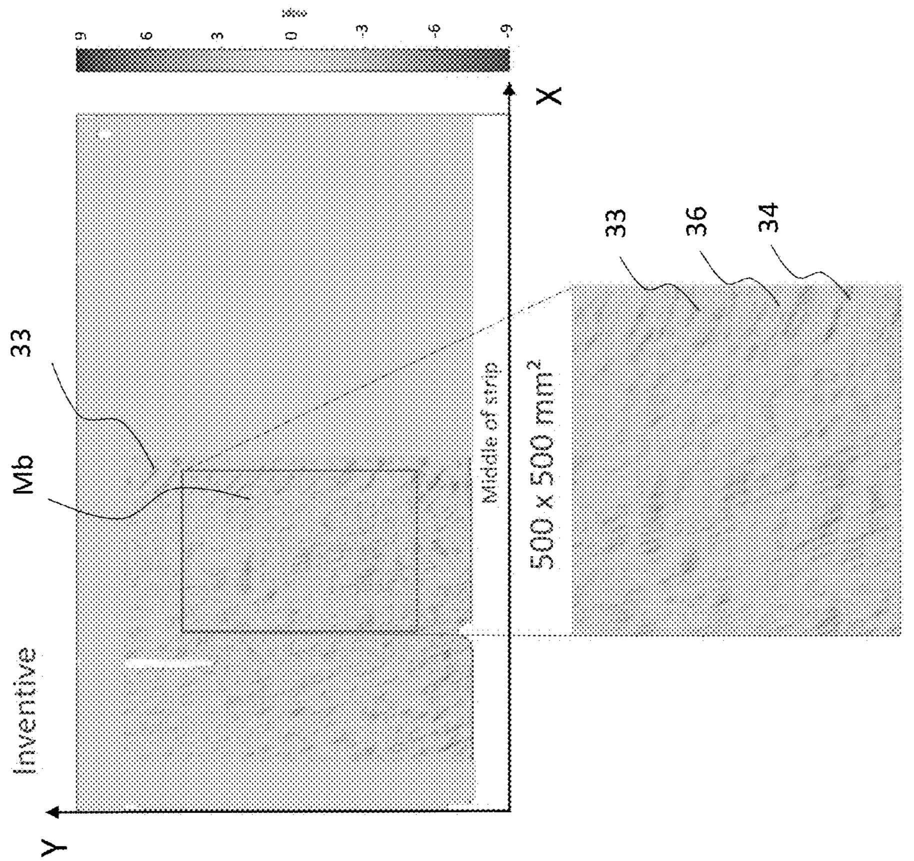
FIG. 7*b* is a sum total of the near-surface refractions of the top side and bottom side of a glass pane within a measurement area Mb for a glass pane produced by the presently disclosed method, in mdpt for inventive values of the sum total of the decadic logarithm of viscosity $\eta_A$, i.e., lg ($\eta_A$/dPa*s), of the respective glass at a distance from the component for throughput regulation at which the glass reached its maximum width after meeting the float bath, and the decadic logarithm of the viscosity $\eta_E$, i.e., lg ($\eta_E$/dPa*s), at the end of the hot forming operation in a spatially resolved diagram, in each case at a tilt angle of 55°.
Figure 7A:
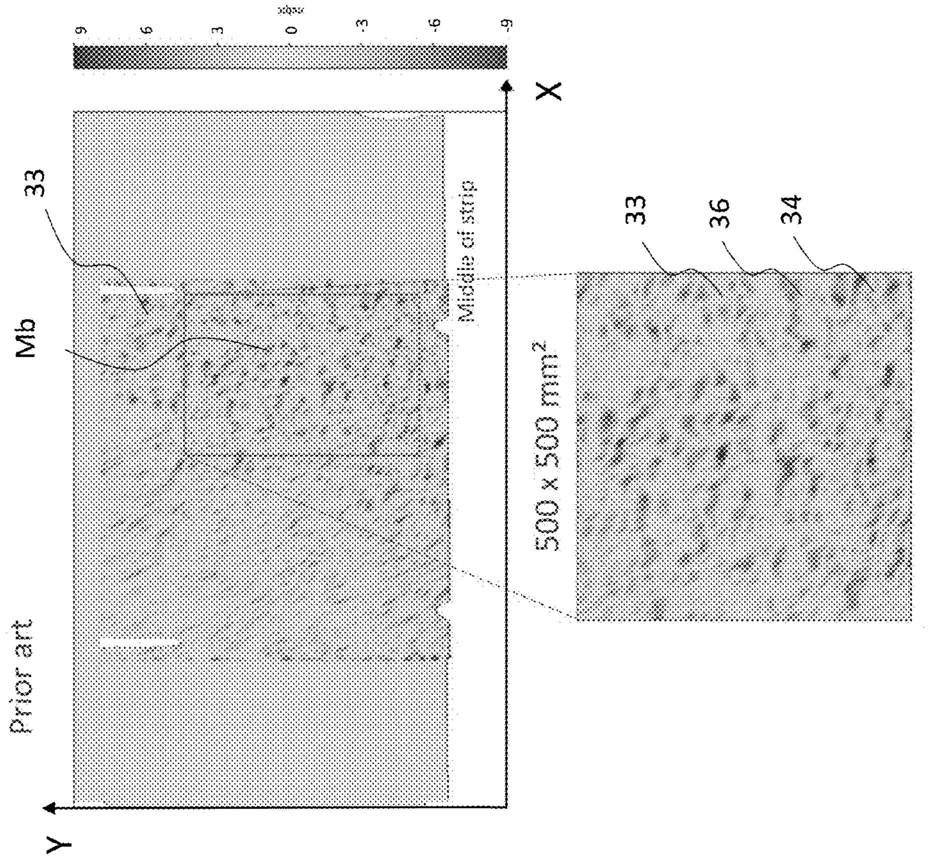
FIG. 7*a* is a sum total of the near-surface refractions of the top side and bottom side of a glass pane within a measurement area Mb for a conventional glass pane, in mdpt for inventive values of the sum total of the decadic logarithm of viscosity $\eta_A$, i.e., lg ($\eta_A$/dPa*s), of the respective glass at a distance from the component for throughput regulation at which the glass reached its maximum width after meeting the float bath, and the decadic logarithm of the viscosity $\eta_E$, i.e., lg ($\eta_E$/dPa*s), at the end of the hot forming operation in a spatially resolved diagram, in each case at a tilt angle of 55°.

It is readily apparent from FIGS. 7*a* and 7*b* that the glass pane 33 produced by the present methods had only very low refractions compared to a conventional glass pane. The refractions of the surface of the top side of the glass pane added to the refractions of the surface of the bottom side of the glass pane were reported here for a conventional glass pane and one produced in accordance with the invention.

Figure 8:
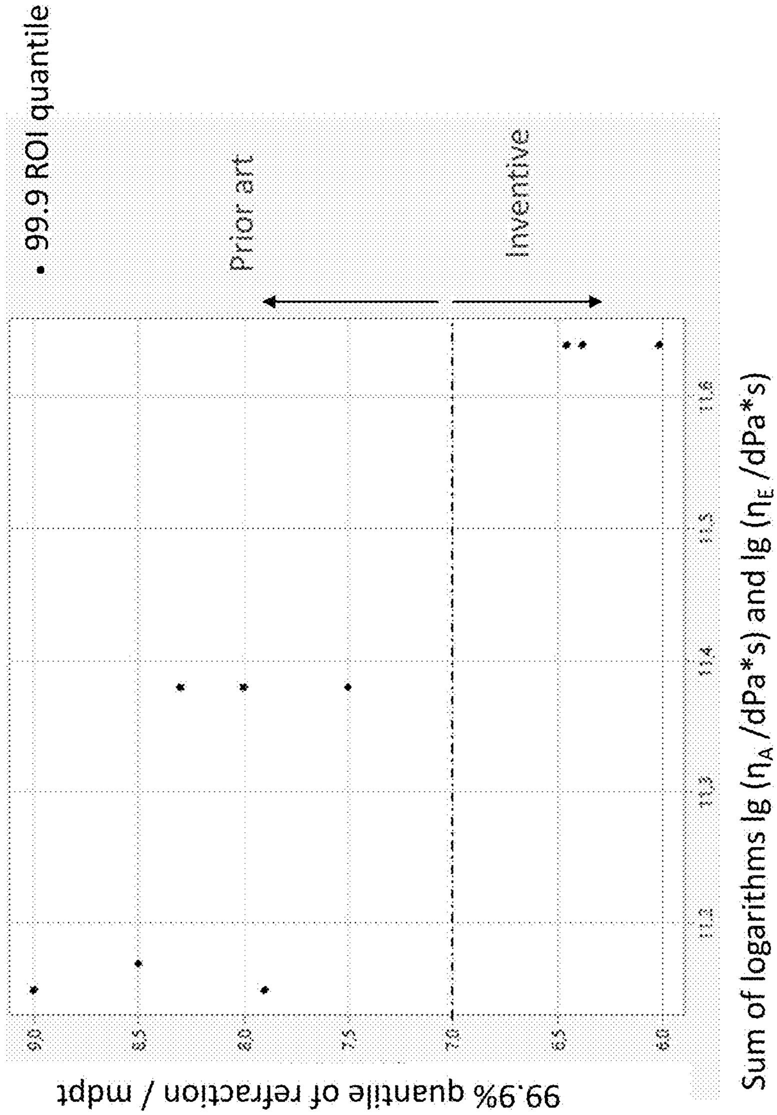
FIG. 8 shows the 99.9% quantiles of the sum total of the near-surface refractions of the top side and bottom side of a glass pane within a measurement area Mb, for conventional glass panes and for a glass pane produced by the presently disclosed method, in mdpt as a function of the value of the sum total of the decadic logarithm of viscosity $\eta_A$, i.e., lg ($\eta_A$/dPa*s), and the decadic logarithm of viscosity $\eta_E$, i.e., lg ($\eta_E$/dPa*s), at a tilt angle of 55°.
Figure 9:
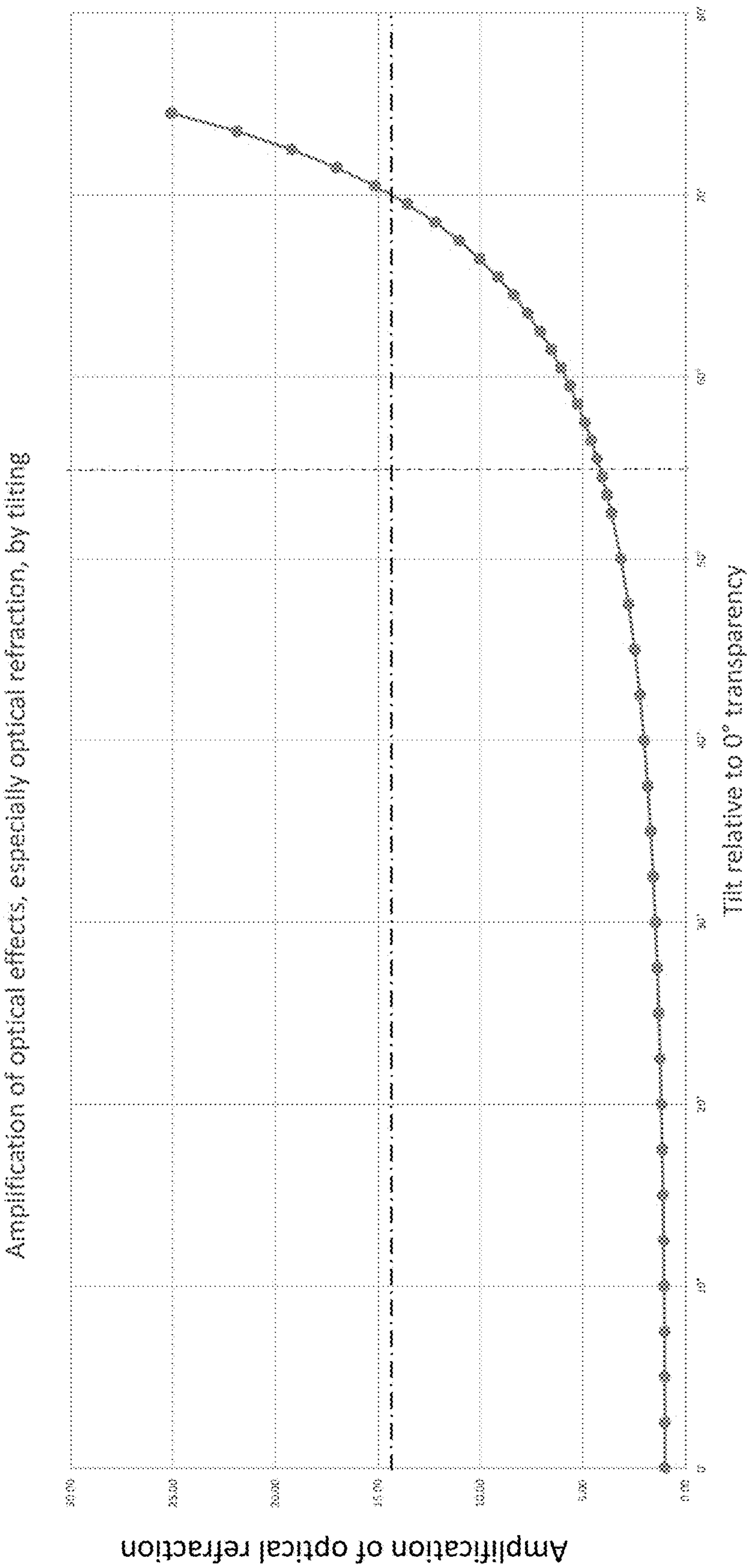
FIG. 9 is an illustration of the enhancement of optical effects by tilting, as occurs in particular in the measurement of the sum total of near-surface refractions of the top side and bottom side of a glass pane.

FIG. 8 shows 99.9% quantiles of the sum total of the near-surface refractions of the top side and bottom side of a glass pane within a measurement area Mb for conventional glass panes and one produced by the presently disclosed method in mdpt as a function of the value of the sum total of the decadic logarithm of the viscosity $\eta_A$, i.e., lg ($\eta_A$/dPa*s), of the respective glass at a distance from the component for throughput regulation at which the glass reached its maximum width after meeting the float bath, and the decadic logarithm of the viscosity $\eta_E$, i.e., lg ($\eta_E$/dPa*s), at the end of the hot forming at a tilt angle of 55°. The glass pane analysed in each case had a thickness of 3.8 mm and consisted of borosilicate glass.

The glass pane produced in accordance with the invention, tilted at an angle of 55°, had magnitudes of the summated near-surface refractions of the top side of the glass pane with the near-surface refractions of the bottom side of the glass pane of regularly below 7 mdpt, and, for example, for a 99.9% quantile, these were in a region of about 6 mdpt. In this case, the measurement was conducted in drawing direction, and hence in Y direction, along the surface of the top side of the glass pane 33.

From these values, using the above-discussed equation 1 for an untilted glass pane, and hence for light incident perpendicularly on the glass pane, magnitudes of the summated near-surface refractions of the top side of the glass pane with the near-surface refractions of the bottom side of the glass pane of regularly below 7 mdpt were found, divided by the above-described factor 4.2, and hence refractions of 0 mdpt to about 1.7 mdpt, and hence of less than 1.66 mdpt in a more exact calculation. For example, these values for the summated near-surface refractions of the top side and bottom side of the glass pane for a 99.9% quantile for light incident perpendicularly on the glass pane were in a region of about 6 mdpt, divided by the above-described factor of 4.2, and hence less than about 1.7, or below 1.66 mdpt in a more exact calculation. The 99.9% quantile was ascertained here for the filtered values obtained within the measurement area Mb. The statements with regard to a 99.9% quantile, with regard to an individual measurement, are at different values from statements with regard to an average, especially arithmetic average, since these are made for 99.9% of the measurements obtained, whereas the arithmetic average covers merely the sum total of all measurements divided by the number thereof and consequently, merely in principle, cannot make a statement valid for 99.9% of the measurements.

In addition to the measurement customary in the industry with the ISRA VISION LABSCAN-SCREEN 2D optical measurement system, which was used with the 4/5/0 (angle/refraction/differentiation length) filter, and with which both the refractions of the top side and of the bottom side of the glass pane singularized from the glass strip were measured simultaneously, the unfiltered raw data from this measuring instrument were also evaluated rather than the aforementioned filtering with the 4/5/0 (angle/refraction/differentiation length) filter, and these were subjected to the filtering described hereinafter.

In the case of these values obtained at the tilt angle of 55°, the individual measurement points each had a distance in drawing direction of 0.8 mm. In order to apply these values to an untilted glass pane, these were first transformed in accordance with the tilt angle Φ as follows for the values thereof obtained in drawing direction, and hence in Y direction, in accordance with the following equation 2:

$$\left(Y_{untilted\,pane} = \frac{Y_{tilted\,pane}}{\cos(\Phi)}\right)$$

with $Y_{untilted\ pane}$=distance of the respective measurement points in the case of an untilted glass pane $Y_{tilted\ pane}$=distance of the respective measurement points in the case of the tilted glass pane Φ=tilt angle For the transformed data, the distance for the respective measurement points, and hence on an untilted pane, was then 1.4 mm.

Figure 10:
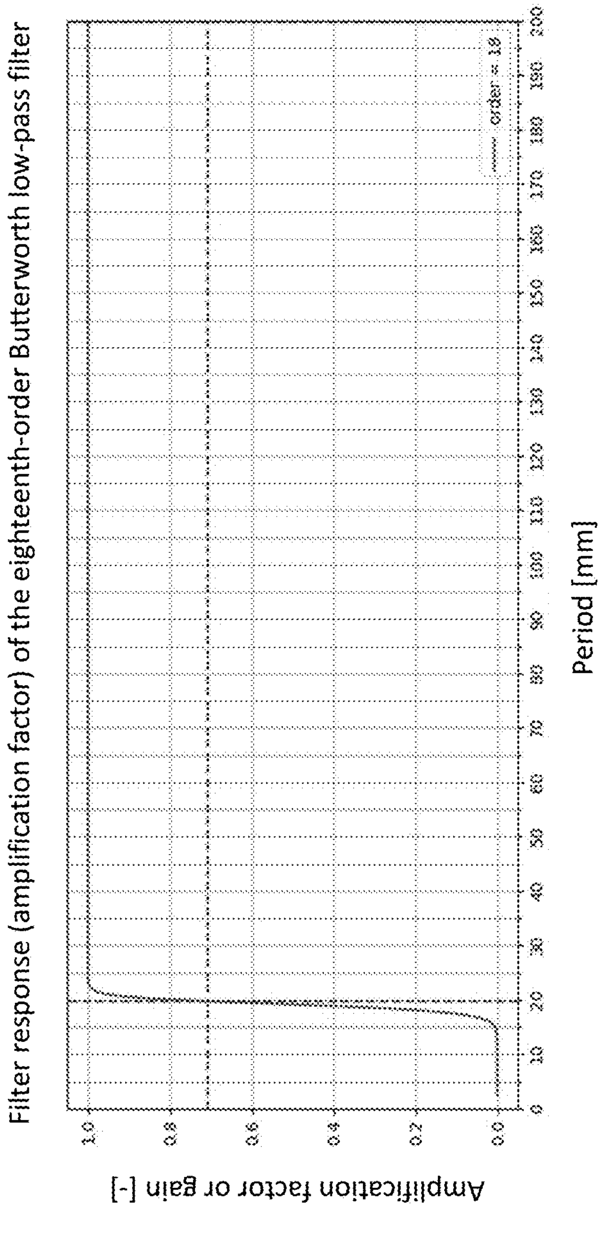
FIG. 10 shows the filter response, i.e., the enhancement factor, of the eighteenth-order Butterworth low-pass filter, as used for filtering of the unfiltered raw data obtained by the ISRA VISION LAB SCAN-SCREEN 2D measuring instrument, as a function of the period or wavelength of the raw data in Y or drawing direction, which have been converted for an untilted pane prior to filtering thereof from the data obtained for a tilted glass pane.

The values obtained thereby were filtered in Y or drawing direction with an 18th-order Butterworth low-pass filter, the filter characteristic of which is shown in FIG. 10. The limiting wavelength of this low-pass filter was 20 mm. It is readily apparent from FIG. 10 that signals having a period or wavelength in drawing direction of less than 15 mm have been essentially completely suppressed, and signals having a period or wavelength in Y direction of more than about 22 mm remained essentially unchanged. For these calculations, the Python SciPy program was used. This filtering was undertaken in order to suppress noise components and disruptive influences, for example particulate coverage or soiling on the glass pane.

Because of the above filtering, however, the values obtained and reported here are not as typically disclosed for fine corrugations of surfaces of conventional glass panes, since these measurements of fine corrugation are measured generally and in a standard manner within a range with a lower cut-off wavelength of λc=0.25 mm and an upper cut-off wavelength of λf=8 mm, but these are essentially completely suppressed by the above-specified filtering.

In this case too, and hence based on the raw data and the above-described low-pass filtering by means of the Butterworth filter, the above-discussed equation 1 for an untilted glass pane, and hence for light incident perpendicularly on the glass pane, gave magnitudes of the summated near-surface refractions of the top side of the glass pane with the near-surface refractions of the bottom side of the glass pane of regularly below 7 mdpt, and in some measurements even of less than 5.7 mdpt, divided by the above-described factor of 4.2, and hence refractions of 0 mdpt to about 1.7 mdpt, and hence of less than 1.66 mdpt in a more exact calculation.

For example, these values of the summated near-surface refractions of the top side and the bottom side of the glass pane for a 99.9% quantile for light incident perpendicularly on the glass pane were in a region of about 6 mdpt, divided by the above-described factor of 4.2, and hence less than about 1.7, or below 1.66 mdpt in a more exact calculation. On the basis of experience of measurement technology with the present evaluations, the inventors assume that the above specifications of the value of 1.7 mdpt may be subject to a maximum variance of about +/−0.1 mdpt. The 99.9% quantile was ascertained here in each case for the filtered values obtained within the measurement area Mb. These statements too with regard to a 99.9% quantile, as already mentioned above, with regard to an individual measurement, are at different values from statements with regard to an average, especially arithmetic average, since these are made for 99.9% of the measurements obtained, whereas the arithmetic average covers merely the sum total of all measurements divided by the number thereof and consequently, merely in principle, cannot make a statement valid for 99.9% of the measurements.

LIST OF REFERENCE NUMERALS

1 float apparatus
2 melt tank
3 batch to be melted, especially glass batch
4 burner
5 glass melt
6 canal
7 float bath
8 glass to be hot-formed
9 float bath furnace
10 roof heater
11 spout
12 top roller
13 glass strip
14 lehr
15 floor and base heater
16 device for melting
17 component for throughput regulation, especially control valve or tweel
18 device for defined adjustment of the viscosity of the molten glass 8 to be hot-formed upstream of the component for throughput regulation 17
19 chamber which is divided from or else may form part of the melt tank 2 and accommodates the molten glass 8 to be formed to a glass strip 13 for defined adjustment of its viscosity
20 fluid flow region
21 fluid flow region
22 wall of chamber 19
23 wall of chamber 19
24 wall of chamber 19
25 wall of chamber 19
26 sensory device or unit
27 bay or tank section 1
28 bay or tank section 2
29 bay or tank section 3
30 bay or tank section 4
31 bay or tank section 5
32 bay or tank section 6
33 glass pane
34 top side of the glass pane 33
35 bottom side of the glass pane 33
36 surface of the top side 34 of the glass pane 33
37 surface of the bottom side 35 of the glass pane 33
38 top roller
39 top roller
40 top roller
41 top roller
42 top roller
43 top roller
44 top roller
45 wall of canal 6
46 wall of canal 6
47 device or apparatus for hot forming
48 upper surface, upper main surface of the glass 8 or glass strip 13 to be hot-formed
49 lower surface, lower main surface of the glass 8 or glass strip 13 to be hot-formed
50 axis of symmetry
51 axis of symmetry
52 perpendicular in negative z direction
53 perpendicular in negative z direction
54 site of entry of the glass 8 into the section Hs for thickness-based hot forming, shown by a dotted line
55 site of exit of the glass 8 from the section Hs for hot forming
56 distance from the component for throughput regulation at which the glass reached its maximum width after meeting the float bath
57 further cooling device
Mb area or measurement area for determination of refractions, especially near-surface refractions
Mi middle of the glass strip in X direction
$\eta$ viscosity
$\eta_A$ viscosity at a distance from the component for throughput regulation at which the glass reached its maximum width after meeting the float bath
$\eta_E$ viscosity at the end of hot forming

What is claimed is:

1. A glass pane, comprising:
a floated and hot formed borosilicate glass having a top side and a bottom side;
a thickness between the top and bottom sides of at least 1.75 mm and at most 7 mm; and
a magnitude of a sum total of refractions from the top side and the bottom side within a square area Mb of 500 mm by 500 mm for light incident perpendicularly on the glass pane for a 99.9% quantile of 0 mdpt to less than 1.7 mdpt in at least one direction parallel to the top side and the bottom side of the glass pane.

2. The glass pane of claim 1, wherein the refractions on the top side and the bottom side are measured during formation of the floated and hot formed borosilicate glass.

3. The glass pane of claim 1, wherein the at least one direction corresponds to a drawing direction during formation of the floated and hot formed borosilicate glass.

4. The glass pane of claim 1, wherein the borosilicate glass comprises the following components in % by weight:

| | |
|---|---|
| $SiO_2$ | 70 to 87, |
| $B_2O_3$ | 5 to 25, |
| $Al_2O_3$ | 0 to 5, |
| $Na_2O$ | 0.5 to 9, |
| $K_2O$ | 0 to 3, |
| CaO | 0 to 3, and |
| MgO | 0 to 2. |

5. The glass pane of claim 1, wherein the borosilicate glass comprises the following components in % by weight:

| | |
|---|---|
| $SiO_2$ | 75 to 85, |
| $B_2O_3$ | 7 to 14, |
| $Al_2O_3$ | 1 to 4, |
| $Na_2O$ | 0.5 to 6.5, |
| $K_2O$ | 0.3 to 2.5, |
| CaO | 0 to 3, and |
| MgO | 0 to 2. |

6. The glass pane of claim 1, wherein the glass pane is a cover pane of a display device.

7. The glass pane of claim 1, wherein the glass pane is an architectural glazing of a building.

8. The glass pane of claim 1, wherein the at least one direction is specified on the glass pane.

9. The glass pane of claim 1, wherein the at least one direction is specified on a package of the glass pane.

10. The glass pane of claim 1, wherein the magnitude of the sum total is determined from values filtered to suppress signals corresponding to fine corrugations measured within a range having a lower cut-off wavelength $\lambda_c$=0.25 mm and an upper cut-off wavelength $\Delta_f$=8 mm.

11. The glass pane of claim 1, wherein the borosilicate glass comprises the following components in % by weight based on oxide:

| | |
|---|---|
| $SiO_2$ | 70 to 86, |
| $Al_2O_3$ | 0 to 5, |
| $B_2O_3$ | 9 to 25, |
| $Na_2O$ | 0.5 to 5, and |
| $K_2O$ | 0 to 1. |

12. The glass pane of claim 1, wherein the borosilicate glass comprises the following components in % by weight:

| | |
|---|---|
| $SiO_2$ | 77 to 80, |
| $Al_2O_3$ | 2 to 5, |
| $B_2O_3$ | 9 to 11, |
| $Na_2O$ | 2.6 to 5.2, |
| $K_2O$ | 0.5 to 2.5, |
| MgO | 0 to 2, and |
| CaO | 1.2 to 2.7. |

13. The glass pane of claim 1, wherein the sum total of refractions comprises a sum of near-surface refractions from the top side and near-surface refractions from the bottom side.

14. The glass pane of claim 1, wherein the 99.9% quantile is less than 1.66 mdpt.

15. The glass pane of claim 1, wherein the borosilicate glass has a linear coefficient of thermal expansion in a range between 20° C. and 300° C. of less than $5\times10^{-6}$/K and at least $3.0\times10^{-6}$/K.

* * * * *